US012675473B2

(12) United States Patent
Chen et al.

(10) Patent No.: US 12,675,473 B2
(45) Date of Patent: Jul. 7, 2026

(54) GENERATING DATABASE QUERY USING MACHINE-LEARNED LARGE LANGUAGE MODELS

(71) Applicant: Maplebear Inc., San Francisco, CA (US)

(72) Inventors: Changyao Chen, New York, NY (US); Xiaoding Krause, Oakland, CA (US); Tilman Drerup, Palo Alto, CA (US); Eric Rynerson, San Francisco, CA (US); Gongqi Li, Brooklyn, NY (US); Tianshu Ren, Santa Clara, CA (US); Yuean Gong, Albany, CA (US); Gene Tabach, Alameda, CA (US)

(73) Assignee: Maplebear Inc., San Francisco, CA (US)

( * ) Notice: Subject to any disclaimer, the term of this patent is extended or adjusted under 35 U.S.C. 154(b) by 0 days.

(21) Appl. No.: 18/586,241

(22) Filed: Feb. 23, 2024

(65) Prior Publication Data

US 2025/0272282 A1     Aug. 28, 2025

(51) Int. Cl.
*G06F 16/2452*          (2019.01)
*G06F 16/248*           (2019.01)
(52) U.S. Cl.
CPC ...... *G06F 16/24522* (2019.01); *G06F 16/248* (2019.01)
(58) Field of Classification Search
None
See application file for complete search history.

(56) References Cited

U.S. PATENT DOCUMENTS

| | | |
|---|---|---|
| 2021/0357375 A1 | 11/2021 | Urdiales et al. |
| 2023/0306033 A1* | 9/2023 | Narechania ....... G06F 16/24575 |
| 2024/0037327 A1 | 2/2024 | Kallepalli et al. |
| 2024/0062019 A1 | 2/2024 | Aberle |
| 2024/0362208 A1* | 10/2024 | Naufel .................. G06F 16/243 |
| 2024/0419705 A1* | 12/2024 | Kotaru .................. G06N 3/045 |
| 2024/0420391 A1* | 12/2024 | Purkayastha ......... G06F 16/248 |
| 2025/0036630 A1* | 1/2025 | Skvortsov ......... G06F 16/24564 |

OTHER PUBLICATIONS

Patent Treaty Cooperation, International Search Report and Written Opinion, PCT Patent Application No. PCT/US2025/016030, Apr. 23, 2025, 11 pages.

* cited by examiner

*Primary Examiner* — Dawaune A Conyers
(74) *Attorney, Agent, or Firm* — Fenwick & West LLP

(57)                    ABSTRACT

A computer system uses a machine-learned language model to generate an SQL query for a user query. The system receives a user query comprising a task for performing a database query. The system identifies an embedding for the user query to represent the user query. The system generates a prompt for input to a machine-learned language model, and the prompt specifies the user query, metadata associated with the identified data table and a request to generate one or more SQL statements for performing the database query on the data table. The system provides the prompt to a model serving system and receives an output generated that includes the requested SQL statements for performing the database query. The system presents a response to the user query using the received SQL statements.

20 Claims, 7 Drawing Sheets

400

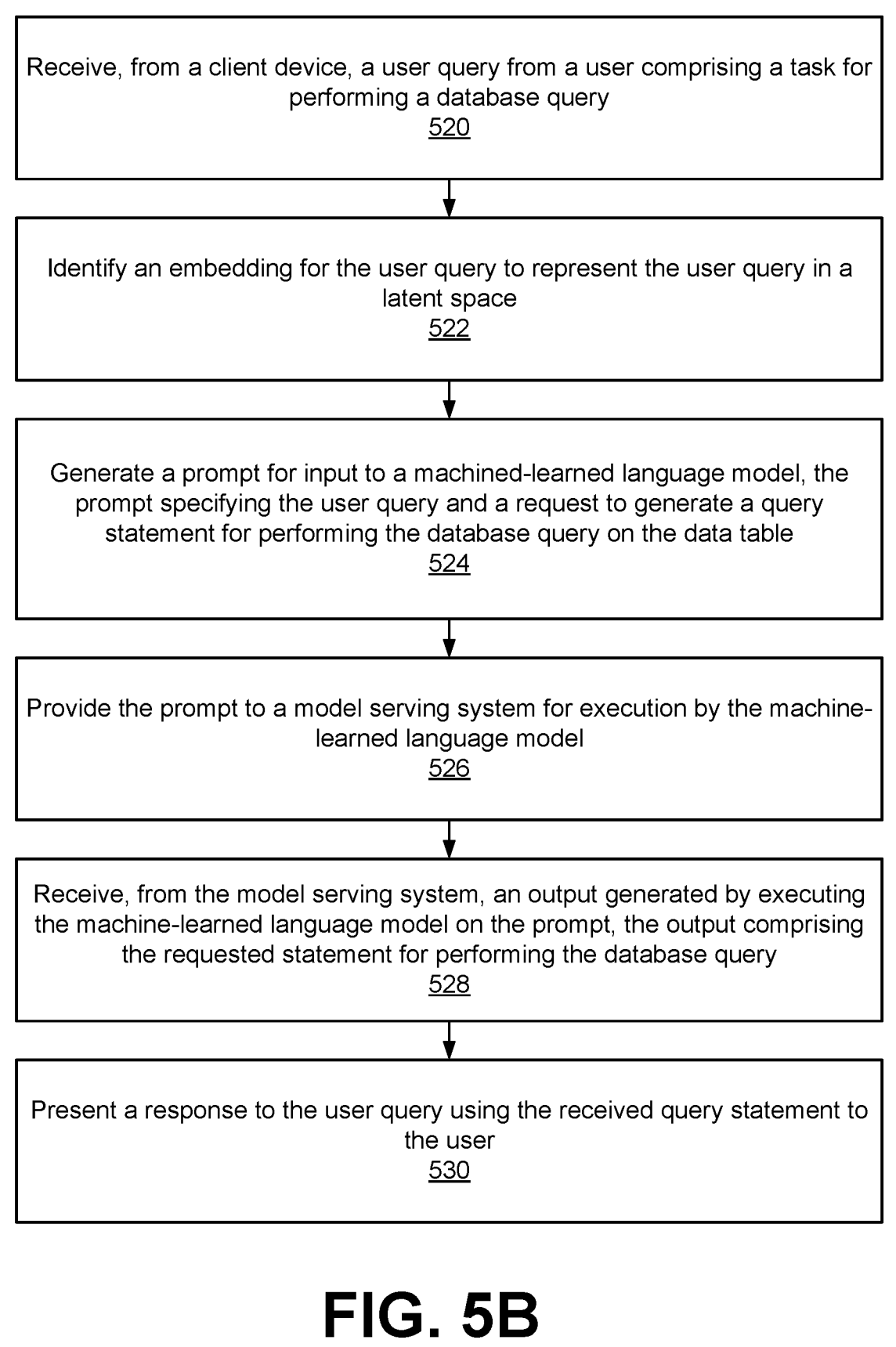

Receive, from a client device, a user query from a user comprising a task for performing a database query
520

Identify an embedding for the user query to represent the user query in a latent space
522

Generate a prompt for input to a machined-learned language model, the prompt specifying the user query and a request to generate a query statement for performing the database query on the data table
524

Provide the prompt to a model serving system for execution by the machine-learned language model
526

Receive, from the model serving system, an output generated by executing the machine-learned language model on the prompt, the output comprising the requested statement for performing the database query
528

Present a response to the user query using the received query statement to the user
530

FIG. 5B

GENERATING DATABASE QUERY USING MACHINE-LEARNED LARGE LANGUAGE MODELS

BACKGROUND

Artificial intelligence (AI) and machine-learned models can be used to generate responses for a variety of tasks. Large language models (LLMs) are used to generate queries, for example, in a structured query language (SQL). Using an LLM to generate an SQL query involves providing a prompt or input to the model and letting it predict the subsequent SQL code based on the context and patterns it has learned during training. While the LLMs have a vast and deep knowledge base and excel at answering general questions, they are typically trained for general purposes. This limitation is due to the general purposes of LLM and its training on the vast user-agnostic training dataset.

SUMMARY

Embodiments of the present disclosure are directed to using a machine-learned language model to generate an SQL query statement for a user query. An online concierge system receives a user query comprising a task for performing a database query. The system generates a prompt for input to a machine-learned language model, and the prompt specifies the user query and a request to generate an SQL query statement for performing the database query on a data table. The system provides the prompt to a model serving system and receives an output generated that includes the requested SQL query for performing the database query. The system presents a response to the user query by executing the received SQL query.

In one or more embodiments, the system also identifies a data table corresponding to the database query by generating a user query embedding representing the user query, and the schema of the identified data table may be provided in the prompt. In accordance with one or more aspects of the disclosure, to identify the data table corresponding to the user query, the online concierge system may access a plurality of dashboard embeddings in a database. Each dashboarding embedding represents an SQL dashboard, and each SQL dashboard may include at least one SQL query that powers the SQL dashboard, one or more data tables corresponding to the at least one SQL query, and metadata of the SQL dashboard. In some embodiments, the metadata of the SQL dashboard may include information that provides details about the SQL dashboard, for example, user comments, text input associated with the intent of the SQL dashboard, and the like. The system may determine a measure of similarity between the user query embedding and at least one dashboard embedding. Based on the determined measure of similarity, the system determines an SQL dashboard corresponding to the user query and a data table corresponding to the database query based on the determined SQL dashboard.

BRIEF DESCRIPTION OF THE DRAWINGS

FIG. 5B is a flowchart of a method of using an LLM to generate a query statement corresponding to a user query, in accordance with one or more embodiments.

DETAILED DESCRIPTION

Figure 1A:
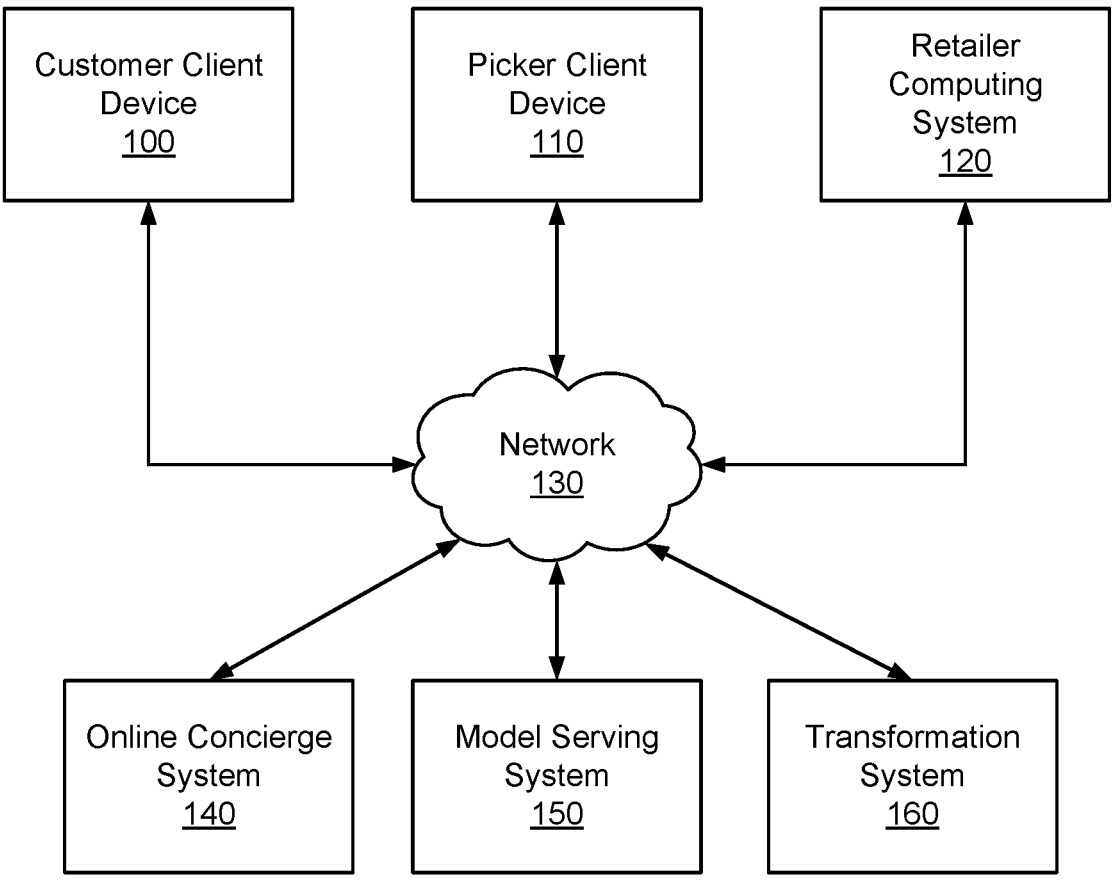
FIG. 1A illustrates an example system environment for an online concierge system, in accordance with one or more embodiments.

FIG. 1A illustrates an example system environment for an online concierge system 140, in accordance with one or more embodiments. The system environment illustrated in FIG. 1A includes a customer client device 100, a picker client device 110, a retailer computing system 120, a network 130, an online concierge system 140, a model serving system 150, and an interface system 160. Alternative embodiments may include more, fewer, or different components from those illustrated in FIG. 1A, and the functionality of each component may be divided between the components differently from the description below. Additionally, each component may perform their respective functionalities in response to a request from a human, or automatically without human intervention.

As used herein, customers, pickers, and retailers may be generically referred to as "users" of the online concierge system 140. Additionally, while one customer client device 100, picker client device 110, and retailer computing system 120 are illustrated in FIG. 1, any number of customers, pickers, and retailers may interact with the online concierge system 140. As such, there may be more than one customer client device 100, picker client device 110, or retailer computing system 120.

The customer client device 100 is a client device through which a customer may interact with the picker client device 110, the retailer computing system 120, or the online concierge system 140. The customer client device 100 can be a personal or mobile computing device, such as a smartphone, a tablet, a laptop computer, or desktop computer. In some embodiments, the customer client device 100 executes a client application that uses an application programming interface (API) to communicate with the online concierge system 140.

A customer uses the customer client device 100 to place an order with the online concierge system 140. An order specifies a set of items to be delivered to the customer. An "item", as used herein, means a good or product that can be provided to the customer through the online concierge system 140. The order may include item identifiers (e.g., a stock keeping unit (SKU) or a price look-up (PLU) code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The customer client device 100 presents an ordering interface to the customer. The ordering interface is a user interface that the customer can use to place an order with the online concierge system 140. The ordering interface may be part of a client application operating on the customer client device 100. The ordering interface allows the customer to search for items that are available through the online concierge system 140 and the customer can select which items to add to a "shopping list." A "shopping list," as used herein, is a tentative set of items that the user has selected for an order but that has not yet been finalized for an order. The ordering interface allows a customer to update the shopping list, e.g., by changing the quantity of items, adding or removing items, or adding instructions for items that specify how the item should be collected.

The customer client device 100 may receive additional content from the online concierge system 140 to present to a customer. For example, the customer client device 100 may receive coupons, recipes, or item suggestions. The customer client device 100 may present the received additional content to the customer as the customer uses the customer client device 100 to place an order (e.g., as part of the ordering interface).

Additionally, the customer client device 100 includes a communication interface that allows the customer to communicate with a picker that is servicing the customer's order. This communication interface allows the user to input a text-based message to transmit to the picker client device 110 via the network 130. The picker client device 110 receives the message from the customer client device 100 and presents the message to the picker. The picker client device 110 also includes a communication interface that allows the picker to communicate with the customer. The picker client device 110 transmits a message provided by the picker to the customer client device 100 via the network 130. In some embodiments, messages sent between the customer client device 100 and the picker client device 110 are transmitted through the online concierge system 140. In addition to text messages, the communication interfaces of the customer client device 100 and the picker client device 110 may allow the customer and the picker to communicate through audio or video communications, such as a phone call, a voice-over-IP call, or a video call.

The picker client device 110 is a client device through which a picker may interact with the customer client device 100, the retailer computing system 120, or the online concierge system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the customer's order to the picker in a collection interface. The collection interface is a user interface that provides information to the picker on which items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item at the retailer, and may even specify a sequence in which the picker should collect the items for improved efficiency in collecting items. In some embodiments, the picker client device 110 transmits to the online concierge system 140 or the customer client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a customer's order. For example, the picker client device 110 displays a delivery location from the order to the picker. The picker client device 110 also provides navigation instructions for the picker to travel from the retailer location to the delivery location. When a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the customer client device 100 for display to the customer, so that the customer can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a customer from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 provides item data indicating which items are available at a particular retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The customer client device 100, the picker client device 110, the retailer computing system 120, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as multiprotocol label switching (MPLS) lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which customers can order items to be provided to them by a picker from a retailer. The online concierge system 140 receives orders from a customer client device 100 through the network 130. The online concierge system 140 selects a picker to service the customer's order and transmits the order to a picker client device 110 associated with the picker. The picker collects the ordered items from a retailer location and delivers the ordered items to the customer. The online concierge system 140 may charge a customer for the order and provide portions of the payment from the customer to the picker and the retailer.

As an example, the online concierge system 140 may allow a customer to order groceries from a grocery store retailer. The customer's order may specify which groceries they want delivered from the grocery store and the quantities of each of the groceries. The customer's client device 100 transmits the customer's order to the online concierge system 140 and the online concierge system 140 selects a picker to travel to the grocery store retailer location to collect the groceries ordered by the customer. Once the picker has collected the groceries ordered by the customer, the picker delivers the groceries to a location transmitted to the picker client device 110 by the online concierge system 140. The online concierge system 140 is described in further detail below with regards to FIG. 2.

The model serving system 150 receives requests from the online concierge system 140 to perform tasks using machine-learned models. The tasks include, but are not limited to, natural language processing (NLP) tasks, audio processing tasks, image processing tasks, video processing tasks, and the like. In one or more embodiments, the machine-learned models deployed by the model serving system 150 are models configured to perform one or more NLP tasks. The NLP tasks include, but are not limited to, text generation, query processing, machine translation, chatbots, and the like. In one or more embodiments, the language model is configured as a transformer neural network architecture. Specifically, the transformer model is coupled to receive sequential data tokenized into a sequence of input tokens and generates a sequence of output tokens depending on the task to be performed.

The model serving system 150 receives a request including input data (e.g., text data, audio data, image data, or video data) and encodes the input data into a set of input tokens. The model serving system 150 applies the machine-learned model to generate a set of output tokens. Each token in the set of input tokens or the set of output tokens may correspond to a text unit. For example, a token may correspond to a word, a punctuation symbol, a space, a phrase, a paragraph, and the like. For an example query processing task, the language model may receive a sequence of input tokens that represent a query and generate a sequence of output tokens that represent a response to the query. For a translation task, the transformer model may receive a sequence of input tokens that represent a paragraph in German and generate a sequence of output tokens that represents a translation of the paragraph or sentence in English. For a text generation task, the transformer model may receive a prompt and continue the conversation or expand on the given prompt in human-like text.

When the machine-learned model is a language model, the sequence of input tokens or output tokens are arranged as a tensor with one or more dimensions, for example, one dimension, two dimensions, or three dimensions. For example, one dimension of the tensor may represent the number of tokens (e.g., length of a sentence), one dimension of the tensor may represent a sample number in a batch of input data that is processed together, and one dimension of the tensor may represent a space in an embedding space. However, it is appreciated that in other embodiments, the input data or the output data may be configured as any number of appropriate dimensions depending on whether the data is in the form of image data, video data, audio data, and the like. For example, for three-dimensional image data, the input data may be a series of pixel values arranged along a first dimension and a second dimension, and further arranged along a third dimension corresponding to RGB channels of the pixels.

In one or more embodiments, the language models are large language models (LLMs) that are trained on a large corpus of training data to generate outputs for the NLP tasks. An LLM may be trained on massive amounts of text data, often involving billions of words or text units. The large amount of training data from various data sources allows the LLM to generate outputs for many tasks. An LLM may have a significant number of parameters in a deep neural network (e.g., transformer architecture), for example, at least 1 billion, at least 15 billion, at least 135 billion, at least 175 billion, at least 500 billion, at least 1 trillion, at least 1.5 trillion parameters.

Since an LLM has significant parameter size and the amount of computational power for inference or training the LLM is high, the LLM may be deployed on an infrastructure configured with, for example, supercomputers that provide enhanced computing capability (e.g., graphic processor units) for training or deploying deep neural network models. In one instance, the LLM may be trained and deployed or hosted on a cloud infrastructure service. The LLM may be pre-trained by the online concierge system 140 or one or more entities different from the online concierge system 140. An LLM may be trained on a large amount of data from various data sources. For example, the data sources include websites, articles, posts on the web, and the like. From this massive amount of data coupled with the computing power of LLM's, the LLM is able to perform various tasks and synthesize and formulate output responses based on information extracted from the training data.

In one or more embodiments, when the machine-learned model including the LLM is a transformer-based architecture, the transformer has a generative pre-training (GPT) architecture including a set of decoders that each perform one or more operations to input data to the respective decoder. A decoder may include an attention operation that generates keys, queries, and values from the input data to the decoder to generate an attention output. In one or more other embodiments, the transformer architecture may have an encoder-decoder architecture and includes a set of encoders coupled to a set of decoders. An encoder or decoder may include one or more attention operations.

While a LLM with a transformer-based architecture is described as a primary embodiment, it is appreciated that in other embodiments, the language model can be configured as any other appropriate architecture including, but not limited to, long short-term memory (LSTM) networks, Markov networks, BART, generative-adversarial networks (GAN), diffusion models (e.g., Diffusion-LM), and the like. The LLM is configured to receive a prompt and generate a response to the prompt. The prompt may include a task request and additional contextual information that is useful for responding to the query. The LLM infers the response to the query from the knowledge that the LLM was trained on and/or from the contextual information included in the prompt.

In one embodiment, the online concierge system 140 fine-tunes or trains a LLM for a text-to-SQL tool that is configured to receive a representation of a user query (e.g., business question), and generate a query statement (e.g., SQL statement) for obtaining the answer to that query. In one or more embodiments, the fine-tuning is performed based on an internal database of dashboards, where a dashboard may be associated with a description explaining the intent or functionality of the dashboard and one or more SQL statements powering the dashboard. By using the internal database, the online concierge system 140 extracts "intent" of the dashboard and maps the intent to the corresponding SQL statements to fine-tune an LLM.

After generating the fine-tuned model, the online concierge system 140 prepares a prompt for input to the LLM of the model serving system 150. For example, in preparing the prompt, the online concierge system 140 may prepare a textual input to the LLM. At least a portion of the prompt is generated by the online concierge system 140 applying a machine-learned language model. The prompt includes a user query and a request to generate a database query that is described in a structured query language (e.g., SQL query statements). The online concierge system 140 receives a response to the prompt from the model serving system 150 based on execution of the machine-learned model using the prompt. The response may be a personalized response for the specific user. The SQL statement can be executed to obtain a response for the user query.

In one or more embodiments, the task for the model serving system 150 is based on knowledge of the online concierge system 140 that is fed to the machine-learned model of the model serving system 150, rather than relying on general knowledge encoded in the model weights of the model. Thus, one objective may be to perform various types of queries on the external data in order to perform any task that the machine-learned model of the model serving system 150 could perform. For example, the task may be to perform question-answering, text summarization, text generation, and the like based on information contained in an external dataset.

Thus, in one or more embodiments, the online concierge system 140 is connected to an interface system 160. The interface system 160 receives external data from the online concierge system 140 and builds a structured index over the external data using, for example, another machine-learned language model or heuristics. The interface system 160 receives one or more queries from the online concierge system 140 on the external data. The interface system 160 constructs one or more prompts for input to the model serving system 150. A prompt may include the query of the user and context obtained from the structured index of the external data. In one instance, the context in the prompt includes portions of the structured indices as contextual information for the query. The interface system 160 obtains one or more responses from the model serving system 160 and synthesizes a response to the query on the external data. While the online concierge system 140 can generate a prompt using the external data as context, often times, the amount of information in the external data exceeds prompt size limitations configured by the machine-learned language model. The interface system 160 can resolve prompt size limitations by generating a structured index of the data and offers data connectors to external data sources.

Figure 1B:
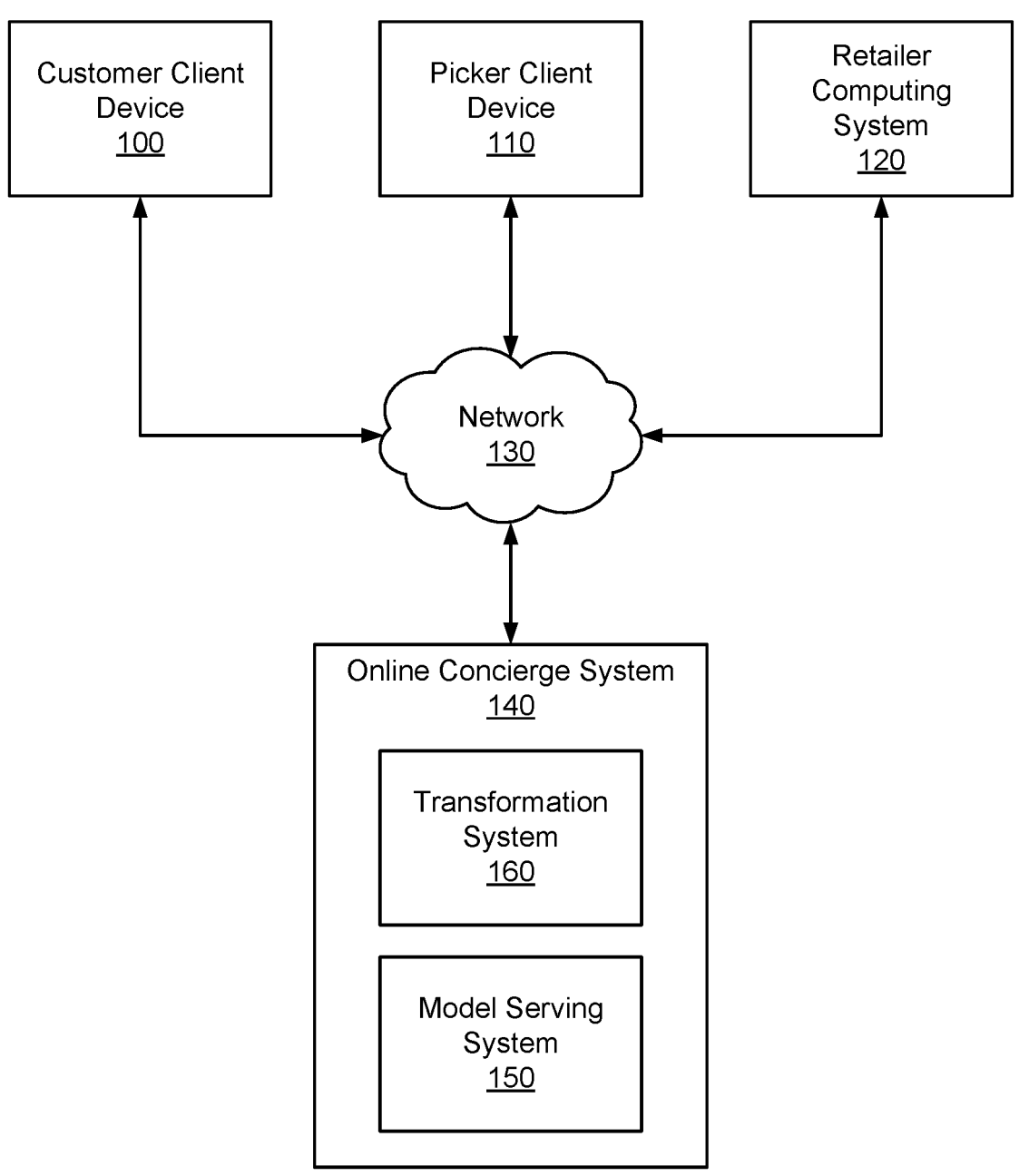
FIG. 1B illustrates an example system environment for an online concierge system, in accordance with one or more embodiments.

FIG. 1B illustrates an example system environment for an online concierge system 140, in accordance with one or more embodiments. The system environment illustrated in FIG. 1B includes a customer client device 100, a picker client device 110, a retailer computing system 120, a network 130, and an online concierge system 140. Alternative embodiments may include more, fewer, or different components from those illustrated in FIG. 1B, and the functionality of each component may be divided between the components differently from the description below. Additionally, each component may perform their respective functionalities in response to a request from a human, or automatically without human intervention.

The example system environment in FIG. 1A illustrates an environment where the model serving system 150 and/or the interface system 160 is managed by a separate entity from the online concierge system 140. In one or more embodiments, as illustrated in the example system environment in FIG. 1B, the model serving system 150 and/or the interface system 160 is managed and deployed by the entity managing the online concierge system 140.

Figure 2:
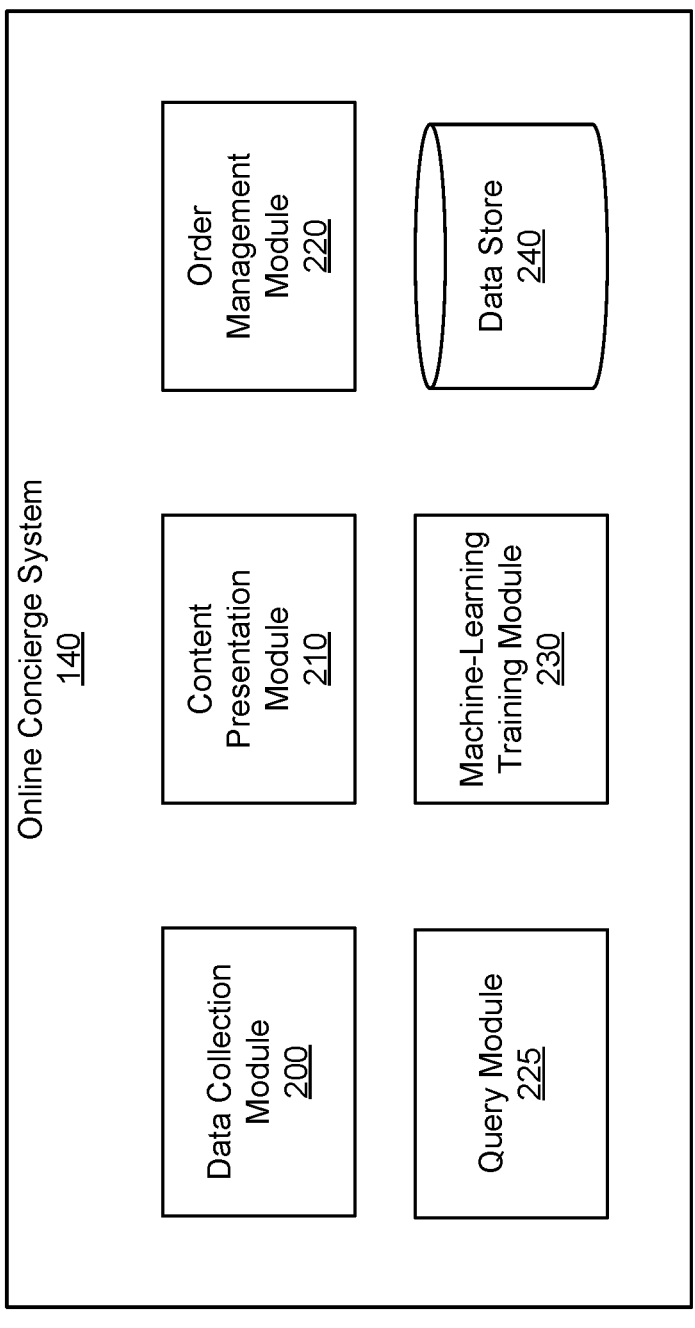
FIG. 2 illustrates an example system architecture for an online concierge system, in accordance with one or more embodiments.

FIG. 2 illustrates an example system architecture for an online concierge system 140, in accordance with some embodiments. The system architecture illustrated in FIG. 2 includes a data collection module 200, a content presentation module 210, an order management module 220, a query module 225, a machine-learning training module 230, and a data store 240. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects customer data, which is information or data that describe characteristics of a customer. Customer data may include a customer's name, address, shopping preferences, favorite items, or stored payment instruments. The customer data also may include default settings established by the customer, such as a default retailer/retailer location, payment instrument, delivery location, or delivery timeframe. The data collection module 200 may collect the customer data from sensors on the customer client device 100 or based on the customer's interactions with the online concierge system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the customer client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the picker data for a picker may include the picker's name, the picker's location, how often the picker has serviced orders for the online concierge system 140, a customer rating for the picker, which retailers the picker has collected items at, or the picker's previous shopping history. Additionally, the picker data may include preferences expressed by the picker, such as their preferred retailers to collect items at, how far they are willing to travel to deliver items to a customer, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online concierge system 140.

Additionally, the data collection module 200 collects order data, which is information or data that describes characteristics of an order. For example, order data may include item data for items that are included in the order, a delivery location for the order, a customer associated with the order, a retailer location from which the customer wants the ordered items collected, or a timeframe within which the customer wants the order delivered. Order data may further include information describing how the order was serviced, such as which picker serviced the order, when the order was delivered, or a rating that the customer gave the delivery of the order. In some embodiments, the order data includes user data for users associated with the order, such as customer data for a customer who placed the order or picker data for a picker who serviced the order.

The content presentation module 210 selects content for presentation to a customer. For example, the content presentation module 210 selects which items to present to a customer while the customer is placing an order. The content presentation module 210 generates and transmits an ordering interface for the customer to order items. The content presentation module 210 populates the ordering interface with items that the customer may select for adding to their order. In some embodiments, the content presentation module 210 presents a catalog of all items that are available to the customer, which the customer can browse to select items to order. The content presentation module 210 also may identify items that the customer is most likely to order and present those items to the customer. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a customer. An item selection model is a machine-learning model that is trained to score items for a customer based on item data for the items and customer data for the customer. For example, the item selection model may be trained to determine a likelihood that the customer will order the item. In some embodiments, the item selection model uses item embeddings describing items and customer embeddings describing customers to score items. These item embeddings and customer embeddings may be generated by separate machine-learning models and may be stored in the data store 240.

In some embodiments, the content presentation module 210 scores items based on a search query received from the customer client device 100. A search query is free text for a word or set of words that indicate items of interest to the customer. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a customer (e.g., by comparing a search query embedding to an item embedding).

In some embodiments, the content presentation module 210 scores items based on a predicted availability of an item. The content presentation module 210 may use an availability model to predict the availability of an item. An availability model is a machine-learning model that is trained to predict the availability of an item at a particular retailer location. For example, the availability model may be trained to predict a likelihood that an item is available at a retailer location or may predict an estimated number of items that are available at a retailer location. The content presentation module 210 may weigh the score for an item based on the predicted availability of the item. Alternatively, the content presentation module 210 may filter out items from presentation to a customer based on whether the predicted availability of the item exceeds a threshold.

In one or more embodiments, the content presentation module 210 receives one or more responses to a user's input (e.g., queries) for presentation to the user while the user is engaged with the ordering interface. The responses may include recommendations of items for fulfilling the user's order request. As described in conjunction with FIGS. 1A and 1B, the responses are personalized for the user, and may be generated based on the user's intention and/or preference and include one or more suggestions to the user to better fulfill the user's request, such as, purpose of the order.

The order management module 220 manages orders for items from customers. The order management module 220 receives orders from a customer client device 100 and assigns the orders to pickers for service based on picker data. For example, the order management module 220 assigns an order to a picker based on the picker's location and the location of the retailer from which the ordered items are to be collected. The order management module 220 may also assign an order to a picker based on how many items are in the order, a vehicle operated by the picker, the delivery location, the picker's preferences on how far to travel to deliver an order, the picker's ratings by customers, or how often a picker agrees to service an order.

In some embodiments, the order management module 220 determines when to assign an order to a picker based on a delivery timeframe requested by the customer with the order. The order management module 220 computes an estimated amount of time that it would take for a picker to collect the items for an order and deliver the ordered items to the delivery location for the order. The order management module 220 assigns the order to a picker at a time such that, if the picker immediately services the order, the picker is likely to deliver the order at a time within the requested timeframe. Thus, when the order management module 220 receives an order, the order management module 220 may delay in assigning the order to a picker if the requested timeframe is far enough in the future (i.e., the picker may be assigned at a later time and is still predicted to meet the requested timeframe).

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the customer client device 100 that describe which items have been collected for the customer's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit, to the picker client device 110, instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the customer with the location of the picker so that the customer can track the progress of the order. In some embodiments, the order management module 220 computes an estimated time of arrival of the picker at the delivery location and provides the estimated time of arrival to the customer.

In some embodiments, the order management module 220 facilitates communication between the customer client device 100 and the picker client device 110. As noted above, a customer may use a customer client device 100 to send a message to the picker client device 110. The order management module 220 receives the message from the customer client device 100 and transmits the message to the picker client device 110 for presentation to the picker. The picker may use the picker client device 110 to send a message to the customer client device 100 in a similar manner.

The order management module 220 coordinates payment by the customer for the order. The order management module 220 uses payment information provided by the customer (e.g., a credit card number or a bank account) to receive payment for the order. In some embodiments, the order management module 220 stores the payment information for use in subsequent orders by the customer. The order management module 220 computes a total cost for the order and charges the customer that cost. The order management module 220 may provide a portion of the total cost to the picker for servicing the order, and another portion of the total cost to the retailer.

The query module 225 performs a task to generate one or more query statements for retrieving information from one or more databases or data sources based on a user input. In one or more embodiments referred to throughout the remainder of the specification, the one or more query statements may be one or more SQL query statements. In one or more embodiments, the user input may be a user query that includes a task for performing a database query. For example, a user query may be "what is the daily revenue in California for the business?" In another embodiment, the user input may be a natural language, such as text, audio signals, etc. The query module 225 receives a user query or question to generate SQL statements to execute to retrieve from a database, a response to the user query. The user query may be received by inputting by the user from a client device.

In one or more embodiments, the query module 225 may identify a data table corresponding to the user query. The user may perform a database query on the identified data table to obtain the response to the user query. In some embodiments, based on the determined data table, the query module 225 may input the user query (in natural language or as an embedding) and metadata associated with the determined data table (e.g., schema of the data table) to request an LLM to generate SQL statements. The SQL statements may be represented to the user as a response to the user query. Alternatively, the query module 225 may perform the SQL query on the data table to obtain a response to the SQL query which may be represented as a response to the user.

The user query may include one or more terms that describe context, user intent, expected response, etc. For example, a user may input "what is the sale of XYZ in the previous month?" to the query module 225. Based on the user query, the query module 225 may determine an expected response to the user query. Using the expected response, user intent, context, and the like, the query module 225 may further identify the corresponding data table that may provide the expected response and/or fulfill the user intent. In some implementations, the online concierge system 140 may access the data store 240 for identifying the database query and/or the data table.

Figure 3:
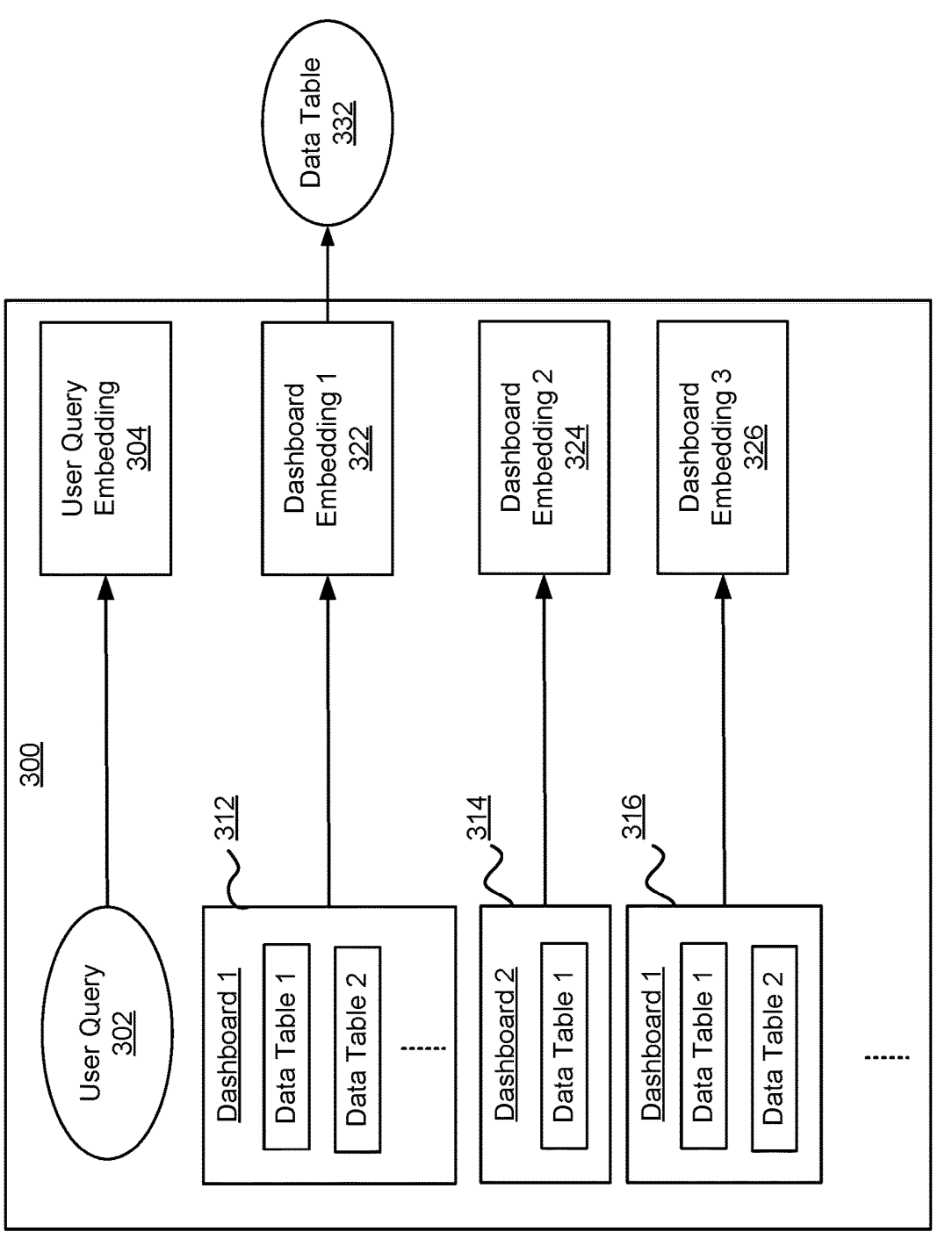
FIG. 3 illustrates a process of identifying a data table corresponding to the database query from the user query at an online concierge system, in accordance with one or more embodiments.

FIG. 3 illustrates a process 300 of identifying a data table corresponding to the database query from the user query at an online concierge system 140, in accordance with one or more embodiments. In some embodiments, the query module 225 may use embeddings to identify the data table. Specifically, the query module 225 receives a user query 302 and generates a user query embedding 304 to represent the user query 302. In one example, the user query embedding 304 may be a vector in a latent space. The query module 225 may access a plurality of dashboard embeddings (e.g., 322, 324, 326, etc.) in a database (e.g., data store 240) and determines an SQL dashboard corresponding to the user query 302 based on the embeddings. With the determined SQL dashboard, the query module 225 may determine a data table 322 that corresponds to the user query 302.

Each dashboard embedding represents an SQL query dashboard (e.g., 312, 314, 316, etc.), and each SQL dashboard may be associated with metadata of the SQL dashboard that describes the SQL dashboard. In some embodiments, the metadata of the SQL dashboard may include information of at least one SQL query that powers the SQL dashboard, and one or more data tables on which each of the at least one SQL query runs to obtain a response to the respective SQL query. In some embodiments, the metadata of an SQL dashboard may include headings, descriptions, feature names, column names, etc.; and in some embodiments, the metadata of an SQL dashboard may include user comments, text input associated with the intent of the SQL dashboard. The query module 225 may use the metadata of an SQL dashboard to generate a dashboard embedding to represent the corresponding SQL dashboard. The query module 225 may generate dashboard embeddings for a plurality of SQL dashboards. The query module 225 may store the generated dashboard embeddings to create a knowledge base, such as a vector database in the data store 240.

In some embodiments, the query module 225 may apply a machine learning model to input data to generate an embedding and store the generated embedding in a database (e.g., data store 240). In one example, the query module 225 may include a trained encoder that encodes (e.g., by using the machine learning model) the input data into an embedding. For instance, during training, input data (e.g., terms included in the user query 302, metadata of an SQL dashboard) may be fed into the encoder and the encoder processes the input data to generate an encoded representation, e.g., an embedding. In some implementations, the embedding may be a vector in a latent space. Once the training is complete, the query module 225 uses the trained embedding model to generate embeddings in the latent space for new input data. The query module 225 may cluster the SQL dashboards based on distances between the plurality of dashboard embeddings in the latent space, and store the dashboard embeddings in the database. In this way, the dashboard embeddings may be used to compare with a user query embedding. In some embodiments, the query module 225 may periodically access new input data from data sources and constantly update the database based on the new input data.

In some embodiments, the query module 225 may identify an SQL dashboard corresponding to the user query 302 based on the user query embedding 304 and the dashboard embeddings (e.g., 322, 324, 326, etc.). As shown in FIG. 3, the query module 225 may access a plurality of dashboard embeddings (e.g., 322, 324, 326, etc.) and compare the user query embedding 304 to the dashboard embeddings to determine a measure of similarity between the user query embedding 304 and one or more dashboard embeddings. In some embodiments, the query module 225 may apply a model to user query embedding 304 and the dashboard embeddings to determine the measure of similarity. In one implementation, the measure of similarity between the user query embedding 304 and a dashboard embedding is a distance between the user query embedding 304 and the dashboard embedding in the latent space. In one example, the query module 225 may identify a dashboard embedding within a threshold distance of the user query embedding 304 in the latent space. The query module 225 may identify the one or more dashboard embeddings using one or more nearest neighbor methods or approximate nearest neighbor methods. In some embodiments, the query module 225 may rank the dashboard embeddings based on the measure of similarities and identify top N dashboard embeddings in the rank as the candidate dashboard embeddings for the user query embedding 304. In other embodiments, the query module 225 determines a measure of similarity between the user query embedding 304 and a dashboard embedding as a dot product or a cosine similarity between the user query embedding 304 and the dashboard embedding.

Based on the identified dashboard embedding, the query module 225 may determine the corresponding SQL dashboard and at least one data table associated with the corresponding SQL dashboard. The determined data table is associated with metadata of the data table that describes structure and properties of the data table. The meta data may be used for understanding and managing the data stored in the data table. For example, the metadata of the data table may include information that provides details about the data table's columns, data types, constraints, relationships, and other attributes. In some examples, the metadata of a data table may further include user comments, text input associated with the intent of the data table, database queries that can be performed on the data table, and the like.

Figure 4:
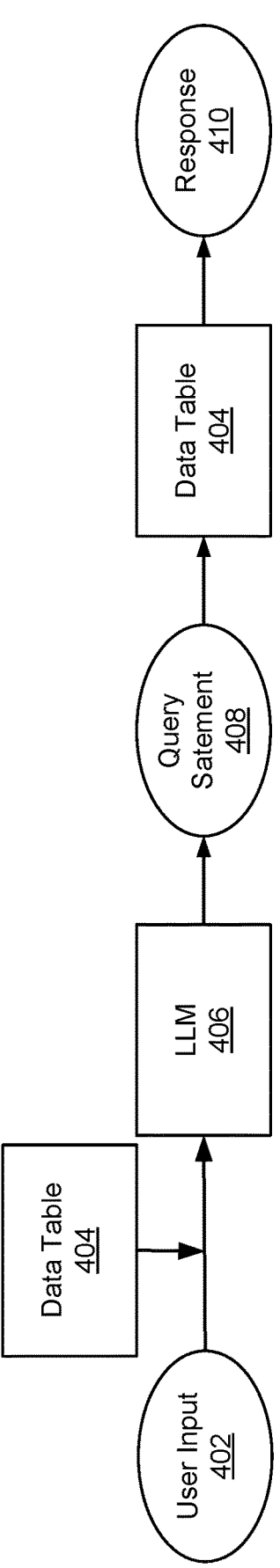
FIG. 4 illustrates an example algorithmic flow of using an LLM to generate a query statement corresponding to a user query at an online concierge system, in accordance with one or more embodiments.

FIG. 4 illustrates an example algorithmic flow 400 of using an LLM to generate a query statement corresponding to a user query at an online concierge system, in accordance with one or more embodiments. The query module 225 receives a user input 402 and generates the prompt based on the user input 402. The user input may include one or more terms that describe the user's request, question, query, etc. In one implementation, the prompt may include a task request and the data table 404 that is identified with embeddings. As discussed in the above sections, the query module 225 may optionally access a database that includes a plurality of dashboard embeddings to identify the data table 404. The query module 225 uses the metadata (e.g., schema) of the data table 404 to construct the prompt to the LLM 406, and provides the prompt to a model serving system 150 for execution by the LLM 406. In one implementation, the prompt may include a task request to the LLM 406 for generating a query statement 408. The query statement 408 may be used to perform a database query to obtain a result. In one example, the query statement 408 may include an SQL query for performing a database query. In some embodiments, the query module 225 may receive the query statement 408 from the execution of the LLM 406 and generate a response using the received query statement 408 to the user input 402. In some embodiments, the query module 225 may perform a database query on the data table 404 using the received the query statement 408 and provide the received database query result as a response 410 to the user query to the user.

In one example, a prompt to the LLM 406 of the model serving system 150 may be, "This a query from a user, the query is "what is the sale for XYZ in the previous month?" The corresponding data is stored in a data table "Invoice," in which Column A includes dates of sale, Column B includes transaction amount of individual sales. Based on this information, please generate an SQL query that can be performed to get a database query result as a response to the user query."

The query module 225 may receive an output from the model serving system 150, and the output includes a query statement 408 that may be performed on the identified data table 404 to obtain a database query result as a response 410 to the user query. In one example, the received output may be:

"SELECT SUM(Column A) AS total_sale
FROM Invoice
WHERE
   MONTH(Column B)=MONTH(CURDATE( )−INTERVAL 1 MONTH)
   AND YEAR(Column B)=YEAR(CURDATE( ))
   AND product_name='XYZ'"

In some embodiments, the query module 225 may finetune the LLM with a training dataset. The training dataset may include a plurality of training examples, and each training example may include a pair of a description of a dashboard and the corresponding SQL query that answers the user query. The SQL query may be associated with a SQL dashboard which is powered by the SQL query. The SQL dashboard includes metadata that describes the SQL dashboard. In some embodiments, the metadata may include information of the SQL dashboard, such as popularity, viewing frequency, and the like. In some embodiments, the metadata may include official certifications. For example, an SQL dashboard may be verified by an authority such that an official certification is assigned to the SQL dashboard to indicate its high confidence of accuracy. Based on the information in the metadata, the query module 225 may weigh the SQL dashboard, the SQL query and the corresponding training example differently. In some embodiments, the query module 225 may use LLMs to generate pairs of user query and SQL query as training examples. The query module 225 may apply the LLM to the training samples to iteratively finetune the LLM model. In some embodiments, the database of the SQL dashboards and the data tables may include dynamic contexts, such as changing data, evolving schema, or real-time updates. The query module 225 may periodically (e.g., weekly) update the training dataset with the updated information from the database, and retrain the LLM model to account for new information, drifts in rankings, etc.

In one or more embodiments, the LLM can be further fine-tuned using a training dataset including pairs of metadata for a data table and corresponding SQL statements that are identified from dashboards, user-submitted SQL statements that are performed on the data table. Similar to how the description of a dashboard (and other metadata) can represent intent of the corresponding SQL statements powering the dashboard, the linkage between metadata of a data table and the SQL statements that are executed on the data table can also represent intent.

Referring to FIG. 2, the machine learning training module 230 trains machine learning models used by the online concierge system 140. For example, the machine learning module 230 may train the item selection model, the availability model, or any of the machine-learned models deployed by the model serving system 150. The online concierge system 140 may use machine learning models to perform functionalities described herein. Example machine learning models include regression models, support vector machines, naïve bayes, decision trees, k nearest neighbors, random forest, boosting algorithms, k-means, and hierarchical clustering. The machine learning models may also include neural networks, such as perceptrons, multilayer perceptrons, convolutional neural networks, recurrent neural networks, sequence-to-sequence models, generative adversarial networks, or transformers.

Each machine learning model includes a set of parameters. A set of parameters for a machine learning model are parameters that the machine learning model uses to process an input. For example, a set of parameters for a linear regression model may include weights that are applied to each input variable in the linear combination that comprises the linear regression model. Similarly, the set of parameters for a neural network may include weights and biases that are applied at each neuron in the neural network. The machine learning training module 230 generates the set of parameters for a machine learning model by "training" the machine learning model. Once trained, the machine learning model uses the set of parameters to transform inputs into outputs.

The machine-learning training module 230 trains machine-learning models used by the online concierge system 140. For example, the machine learning module 230 may train the item selection model, the availability model, or any of the machine-learned models deployed by the model serving system 150. The online concierge system 140 may use machine-learning models to perform functionalities described herein. Example machine-learning models include reinforcement learning models, regression models, support vector machines, naïve bayes, decision trees, k nearest neighbors, random forest, boosting algorithms, k-means, and hierarchical clustering. The machine-learning models may also include neural networks, such as perceptrons, multilayer perceptrons, convolutional neural networks, recurrent neural networks, sequence-to-sequence models, generative adversarial networks, or transformers. A machine-learning model may include components relating to these different general categories of model, which may be sequenced, layered, or otherwise combined in various configurations.

Each machine-learning model includes a set of parameters. The set of parameters for a machine-learning model are parameters that the machine-learning model uses to process an input to generate an output. For example, a set of parameters for a linear regression model may include weights that are applied to each input variable in the linear combination that comprises the linear regression model. Similarly, the set of parameters for a neural network may include weights and biases that are applied at each neuron in the neural network. The machine-learning training module 230 generates the set of parameters (e.g., the particular values of the parameters) for a machine-learning model by "training" the machine-learning model. Once trained, the machine-learning model uses the set of parameters to transform inputs into outputs.

The machine-learning training module 230 trains a machine-learning model based on a set of training examples. Each training example includes input data to which the machine-learning model is applied to generate an output. For example, each training example may include customer data, picker data, item data, or order data. In some cases, the training examples also include a label which represents an expected output of the machine-learning model. In these cases, the machine-learning model is trained by comparing its output from input data of a training example to the label for the training example. In general, during training with labeled data, the set of parameters of the model may be set or adjusted to reduce a difference between the output for the training example (given the current parameters of the model) and the label for the training example.

The machine-learning training module 230 may apply an iterative process to train a machine-learning model whereby the machine-learning training module 230 updates parameter values of the machine-learning model based on each of the set of training examples. The training examples may be processed together, individually, or in batches. To train a machine-learning model based on a training example, the machine-learning training module 230 applies the machine-learning model to the input data in the training example to generate an output based on a current set of parameter values. The machine-learning training module 230 scores the output from the machine-learning model using a loss function. A loss function is a function that generates a score for the output of the machine-learning model such that the score is higher when the machine-learning model performs poorly and lower when the machine-learning model performs well. In cases where the training example includes a label, the loss function is also based on the label for the training example. Some example loss functions include the mean square error function, the mean absolute error, hinge loss function, and the cross entropy loss function. The machine-learning training module 230 updates the set of parameters for the machine-learning model based on the score generated by the loss function. For example, the machine-learning training module 230 may apply gradient descent to update the set of parameters.

The data store 240 stores data used by the online concierge system 140. For example, the data store 240 stores customer data, item data, order data, and picker data for use by the online concierge system 140. The data store 240 also stores trained machine-learning models trained by the machine-learning training module 230. For example, the data store 240 may store the set of parameters for a trained machine-learning model on one or more non-transitory, computer-readable media. In some implementations, the data store 240 may store outputs from a trained machine-learning model so that the stored outputs may be accessed and used as inputs for training one or more machine-learning models. For instance, the data store 240 may store the output of user representations, e.g., embeddings of user preference, embeddings of user intention, etc. The stored user representations may be used to generate prompts for LLM. In another example, the stored user representations may be used as input to an evaluation model. The data store 240 uses computer-readable media to store data, and may use databases to organize the stored data.

With respect to the machine-learned models hosted by the model serving system 150, the machine-learned models may already be trained by a separate entity from the entity responsible for the online concierge system 140 or by the online concierge system 140. In one or more other embodiments, when the model serving system 150 is included in the online concierge system 140, the machine-learning training module 230 may further train parameters of the machine-learned model (e.g., LLM) based on data specific to the online concierge system 140 stored in the data store 240. As an example, the machine-learning training module 230 may obtain additional training data and further fine tune the parameters of the transformer model deployed by the model serving system 150 based on the additional training data. The machine-learning training module 230 may provide the additional training data to the model serving system 150 for fine tuning the parameters of the machine-learned model deployed on the model serving system 150.

In some embodiments, the data store 240 may include a database that stores a plurality of dashboard embeddings and the related SQL dashboards and metadata. The dashboard embeddings may be vectors in a latent space and the database may be a vector database. In some embodiments, the data store 240 may store a plurality of models. The models may include a machine learning model. In some implementations, the models may be used encode metadata of an SQL dashboard to a dashboard embedding in a latent space. In some implementations, the models may receive a user query as an input and generate a user query embedding corresponding to the user query. In some embodiments, the models may include models that determine a measure of similarity between a user query embedding and a dashboard embedding.

Figure 5A:
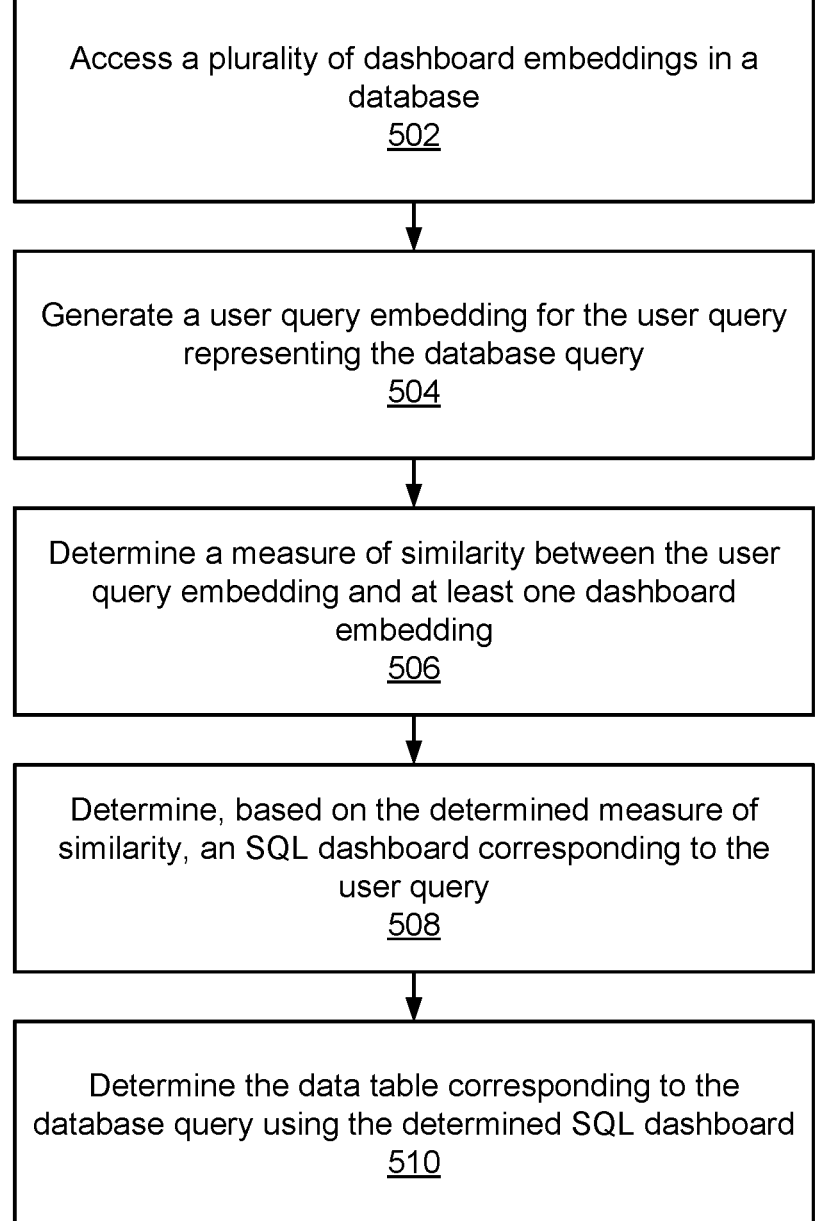
FIG. 5A is a flowchart of a method of using an LLM to generate a query statement corresponding to a user query, in accordance with one or more embodiments.

FIG. 5A illustrates an exemplary method of identifying a data table corresponding to the database query from the user query, in accordance with one or more embodiments. Alternative embodiments may include more, fewer, or different steps from those illustrated in FIG. 5A, and the steps may be performed in a different order from that illustrated in FIG. 5A. These steps may be performed by an online concierge system (e.g., the online concierge system 140). Additionally, each of these steps may be performed automatically by the online concierge system without human intervention.

The online concierge system 140 accesses 502 a plurality of dashboard embeddings in a database. Each dashboarding embedding may represent an SQL dashboard which includes at least one SQL query that powers the SQL dashboard, one or more data tables corresponding to the at least one SQL query, and metadata of the SQL dashboard. The online concierge system 140 generates 504 a user query embedding for a user query that is received from a client device from the user. The user query may include a task for performing a database query. The user query embedding may be used to represent the user query and/or the database query associated with the user query. The online concierge system 140 may determine 506 a measure of similarity between the user query embedding and at least one dashboard embedding. Based on the determined measure of similarity, the online concierge system 140 may determine 508 an SQL dashboard corresponding to the user query. In one example, the online concierge system 140 may identify a dashboard embedding that is nearest to the user query embedding in the latent space, for example, by using one or more nearest neighbor methods or approximate nearest neighbor methods. The online concierge system 140 determines the SQL dashboard having the nearest dashboard embedding as the SQL dashboard corresponding to the user query. The determined SQL dashboard may include one or more data tables that answer the user query. Using the determined SQL dashboard, the online concierge system 140 may determine 510 a data table corresponding to the database query associated with the user query. In some embodiments, the determined data table may be used to obtain a response to the user query by performing the database query on the data table.

FIG. 5B is a flowchart of a method of using an LLM to generate a query statement corresponding to a user query, in accordance with one or more embodiments. Alternative embodiments may include more, fewer, or different steps from those illustrated in FIG. 5B, and the steps may be performed in a different order from that illustrated in FIG. 5B. These steps may be performed by an online concierge system (e.g., the online concierge system 140). Additionally, each of these steps may be performed automatically by the online concierge system without human intervention.

The online concierge system 140 receives 520 a user query from a user. The user query may include a task for performing a database query. The user query may be input by the user from a client device, and include one or more terms that describe the user's request, question, query, etc. The online concierge system 140 may identify 522 an embedding for the user query to represent the user query in a latent space. In one example, the online concierge system 140 may generate a user query embedding to represent the user query and access a plurality of dashboard embeddings. As discussed in the above sections, the online concierge system 140 may compare the user query embedding and one or more dashboard embeddings to identify an SQL dashboard and the associated data table. The online concierge system 140 generates 524 a prompt for input to a machine-learned language model. The prompt specifies the user query, metadata associated with the identified data table and a request to generate a query statement for performing the database query on the data table. In some embodiments, the query statement may include an SQL query for performing the database query on the data table. The online concierge system 140 provides 526 the prompt to a model serving system (e.g., the model serving system 150) for execution by the machine-learned language model. The online concierge system 140 receives 528, from the model serving system, an output generated by executing the machine-learned language model on the prompt. The output may include an SQL query for performing the database query. The online concierge system 140 may present 530 a response to the user query using the received query statement to the user. In some embodiments, the online concierge system 140 may perform the received query statement on the identified data table and receive result from performing an SQL query. The online concierge system 140 may use the received result to generate a response to the user query and present the response to the user via the client device. In some embodiments, the LLM may be further fine-tuned using a training dataset including pairs of metadata for a data table and corresponding SQL statements that are identified from SQL dashboards, user-submitted SQL statements that are performed on the data table. Similar to how the description of a dashboard (and other metadata) can represent intent of the corresponding SQL statements powering the dashboard, the linkage between metadata of a data table and the SQL statements that are executed on the data table can also represent intent.

ADDITIONAL CONSIDERATIONS

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The training process may include: applying the machine-learning model to a training example, comparing an output of the machine-learning model to the label associated with the training example, and updating weights associated for the machine-learning model through a back-propagation process. The weights may be stored on one or more computer-readable media, and are used by a system when applying the machine-learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present); A is false (or not present) and B is true (or present); and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method comprising:
receiving, from a client device, a user query from a user, the user query comprising a task for performing a database query;
identifying an embedding for the user query to represent the user query in a latent space;

generating a prompt for input to a machine-learned language model, the prompt specifying the user query and a request to generate one or more SQL statements for performing the database query on a data table, wherein the machine-learned language model is trained by:
identifying one or more SQL dashboards implemented for the online system, wherein a SQL dashboard is powered by at least one SQL query,
for each identified SQL dashboard, obtaining a training example including a pair of inputs including metadata describing the SQL dashboard, and outputs including the at least one SQL query powering the identified SQL dashboard, the metadata including one or a combination of column features of data tables associated with the SQL dashboard, headings, descriptions, user comments, or text input for the SQL dashboard,
obtaining a loss indicating a difference between the outputs of the training example and outputs obtained by applying the machine-learned language model to the inputs of the training example, and
fine-tuning parameters of the machine-learned model to reduce the loss based on the metadata obtained for the one or more SQL dashboards and the at least one SQL query powering the one or more SQL dashboards;
providing the prompt to a model serving system for execution by the machine-learned language model;
receiving, from the model serving system, an output generated by executing the machine-learned language model on the prompt, the output comprising the requested one or more SQL statements for performing the database query;
performing an SQL query included in the SQL statements;
receiving a result from performing the SQL query; and
presenting the received result as a response to the user query.

2. The method of claim 1, further comprising:
finetuning the machine-learned language model by using a training dataset including pairs of metadata of a data table, corresponding SQL statements that are identified from SQL dashboards, and user-submitted SQL statements that are performed on the data table.

3. The method of claim 1, wherein identifying an embedding for the user query to represent the user query in a latent space comprises:
generating a user query embedding based on the user query;
accessing a plurality of dashboard embeddings in a database, each dashboarding embedding representing an SQL dashboard, and each SQL dashboard comprising at least one SQL query that powers the SQL dashboard, one or more data tables corresponding to the at least one SQL query, and metadata of the SQL dashboard; and
identifying a measure of similarity between the user query embedding and at least one dashboard embedding.

4. The method of claim 3, wherein accessing a plurality of dashboard embeddings in a database comprise:
generating a dashboard embedding for each of a plurality of SQL dashboards using the corresponding metadata of the SQL dashboard.

5. The method of claim 3, wherein identifying, based on the determined measure of similarity, an SQL dashboard corresponding to the user query comprises:

selecting an SQL dashboard corresponding to a dashboard embedding that has at least a threshold measure of similarity to the SQL dashboard corresponding to the user query.

6. The method of claim 3, wherein identifying, based on the determined measure of similarity, an SQL dashboard corresponding to the user query comprises:

ranking the at least one dashboard embedding based on the determined measure of similarity; and selecting the SQL dashboard based on the ranking of the corresponding dashboard embeddings.

7. The method of claim 3, wherein the measure of similarity between the user query embedding and at least one dashboard embedding is a distance between the user query embedding and the at least one dashboard embedding in the latent space.

8. A computer program product comprising a non-transitory computer readable storage medium having instructions encoded thereon that, when executed by a processor, cause the processor to perform steps comprising:

receiving, from a client device, a user query from a user, the user query comprising a task for performing a database query;

identifying an embedding for the user query to represent the user query in a latent space;

generating a prompt for input to a machine-learned language model, the prompt specifying the user query and a request to generate one or more SQL statements for performing the database query on a data table, wherein the machine-learned language model is trained by:

identifying one or more SQL dashboards implemented for the online system, wherein a SQL dashboard is powered by at least one SQL query, for each identified SQL dashboard, obtaining a training example including a pair of inputs including metadata describing the SQL dashboard, and outputs including the at least one SQL query powering the identified SQL dashboard, the metadata including one or a combination of column features of data tables associated with the SQL dashboard, headings, descriptions, user comments, or text input for the SQL dashboard, obtaining a loss indicating a difference between the outputs of the training example and outputs obtained by applying the machine-learned language model to the inputs of the training example, and fine-tuning parameters of the machine-learned model to reduce the loss based on the metadata obtained for the one or more SQL dashboards and the at least one SQL query powering the one or more SQL dashboards;

providing the prompt to a model serving system for execution by the machine-learned language model;

receiving, from the model serving system, an output generated by executing the machine-learned language model on the prompt, the output comprising the requested one or more SQL statements for performing the database query;

performing an SQL query included in the SQL statements;

receiving a result from performing the SQL query; and presenting the received result as a response to the user query.

9. The computer program product of claim 8, wherein the instructions further causes the processor to perform steps comprising:

finetuning the machine-learned language model by using a training dataset including pairs of metadata of a data table, corresponding SQL statements that are identified from SQL dashboards, and user-submitted SQL statements that are performed on the data table.

10. The computer program product of claim 8, wherein the instructions to identify an embedding for the user query to represent the user query in a latent space further cause the processor to perform steps comprising:

generating a user query embedding based on the user query;

accessing a plurality of dashboard embeddings in a database, each dashboarding embedding representing an SQL dashboard, and each SQL dashboard comprising at least one SQL query that powers the SQL dashboard, one or more data tables corresponding to the at least one SQL query, and metadata of the SQL dashboard; and identifying a measure of similarity between the user query embedding and at least one dashboard embedding.

11. The computer program product of claim 10, wherein the instructions to access a plurality of dashboard embeddings in a database further cause the processor to perform steps comprising:

generating a dashboard embedding for each of a plurality of SQL dashboards using the corresponding metadata of the SQL dashboard.

12. The computer program product of claim 10, wherein the instructions to identify, based on the determined measure of similarity, an SQL dashboard corresponding to the user query further cause the processor to perform steps comprising:

selecting an SQL dashboard corresponding to a dashboard embedding that has at least a threshold measure of similarity the SQL dashboard corresponding to the user query.

13. The computer program product of claim 10, wherein the instructions to identify, based on the determined measure of similarity, an SQL dashboard corresponding to the user query further cause the processor to perform steps comprising:

ranking the at least one dashboard embedding based on the determined measure of similarity; and selecting the SQL dashboard based on the ranking of the corresponding dashboard embeddings.

14. The computer program product of claim 10, wherein the measure of similarity between the user query embedding and at least one dashboard embedding is a distance between the user query embedding and the at least one dashboard embedding in the latent space.

15. A computer system comprising:

a processor; and a non-transitory computer-readable storage medium having instructions that, when executed by the processor, cause the computer system to perform steps comprising:

receiving, from a client device, a user query from a user, the user query comprising a task for performing a database query;

identifying an embedding for the user query to represent the user query in a latent space;

generating a prompt for input to a machine-learned language model, the prompt specifying the user query and a request to generate one or more SQL statements for performing the database query on a data table, wherein the machine-learned language model is trained by:

identifying one or more SQL dashboards implemented for the online system, wherein a SQL dashboard is powered by at least one SQL query, for each identified SQL dashboard, obtaining a training example including a pair of inputs including metadata describing the SQL dashboard, and outputs including the at least one SQL query powering the identified SQL dashboard, the metadata including one or a combination of column features of data tables associated with the SQL dashboard, headings, descriptions, user comments, or text input for the SQL dashboard, obtaining a loss indicating a difference between the outputs of the training example and outputs obtained by applying the machine-learned language model to the inputs of the training example, and fine-tuning parameters of the machine-learned model to reduce the loss based on the metadata obtained for the one or more SQL dashboards and the at least one SQL query powering the one or more SQL dashboards;

providing the prompt to a model serving system for execution by the machine-learned language model;

receiving, from the model serving system, an output generated by executing the machine-learned language model on the prompt, the output comprising the requested one or more SQL statements for performing the database query;

performing an SQL query included in the SQL statements;

receiving a result from performing the SQL query; and presenting the received result as a response to the user query.

16. The system of claim 15, wherein the instructions further cause the processors to perform steps comprising:

finetuning the machine-learned language model by using a training dataset including pairs of metadata of a data table, corresponding SQL statements that are identified from SQL dashboards, and user-submitted SQL statements that are performed on the data table.

17. The system of claim 15, wherein the instructions to identify an embedding for the user query to represent the user query in a latent space further cause the processor to perform steps comprising:

generating a user query embedding based on the user query;

accessing a plurality of dashboard embeddings in a database, each dashboarding embedding representing an SQL dashboard, and each SQL dashboard comprising at least one SQL query that powers the SQL dashboard, one or more data tables corresponding to the at least one SQL query, and metadata of the SQL dashboard; and identifying a measure of similarity between the user query embedding and at least one dashboard embedding.

18. The system of claim 17, wherein the instructions to access a plurality of dashboard embeddings in a database further cause the processor to perform steps comprising:

generating a dashboard embedding for each of a plurality of SQL dashboards using the corresponding metadata of the SQL dashboard.

19. The system of claim 17, wherein the instructions to identify, based on the determined measure of similarity, an SQL dashboard corresponding to the user query further cause the processor to perform steps comprising:

selecting an SQL dashboard corresponding to a dashboard embedding that has at least a threshold measure of similarity the SQL dashboard corresponding to the user query.

20. The system of claim 17, wherein the instructions to identify, based on the determined measure of similarity, an SQL dashboard corresponding to the user query further cause the processor to perform steps comprising:

ranking the at least one dashboard embedding based on the determined measure of similarity; and selecting the SQL dashboard based on the ranking of the corresponding dashboard embeddings.

\* \* \* \* \*